(12) United States Patent
Tiwari et al.

(10) Patent No.: US 11,540,105 B2
(45) Date of Patent: Dec. 27, 2022

(54) UE BEHAVIOR WHEN THE DEVICE IS ATTACHED FOR EMERGENCY SERVICE

(71) Applicant: NEC Corporation, Tokyo (JP)

(72) Inventors: Kundan Tiwari, Tamil Nadu (IN); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/253,160

(22) PCT Filed: May 31, 2019

(86) PCT No.: PCT/JP2019/021667
§ 371 (c)(1),
(2) Date: Dec. 17, 2020

(87) PCT Pub. No.: WO2020/003886
PCT Pub. Date: Jan. 2, 2020

(65) Prior Publication Data
US 2021/0281993 A1    Sep. 9, 2021

(30) Foreign Application Priority Data

Jun. 25, 2018 (IN) .............................. 201811023556

(51) Int. Cl.
*H04W 4/90*    (2018.01)
*H04W 60/04*   (2009.01)
*H04W 84/04*   (2009.01)

(52) U.S. Cl.
CPC ............. *H04W 4/90* (2018.02); *H04W 60/04* (2013.01); *H04W 84/042* (2013.01)

(58) Field of Classification Search
CPC ...... H04B 1/005; H04B 1/0057; H04B 1/406; H04W 88/06; H04W 76/50; H04W 4/90;
(Continued)

(56) References Cited

U.S. PATENT DOCUMENTS 8,862,090 B2 * 10/2014 Shaw .................... H04W 76/36
455/404.1
9,584,995 B2 *  2/2017 Chuttani ............... H04W 48/18
(Continued)

FOREIGN PATENT DOCUMENTS

CA     2812944  A1 *  4/2012  ......... H04L 61/2007
CN   105493572  A  *  4/2016  ............ H04W 48/16
(Continued)

OTHER PUBLICATIONS

"Enhancement of the definition of a "Subscriber"", SA1 (Siemens AG), 3GPP TR 21.905, TSG-SA WG1 #17, S1-021715, Aug. 12-16, 2002, pp. 1-3, Durango, USA.
(Continued)

*Primary Examiner* — Matthew C Sams

(57) ABSTRACT

This disclosure is related to a procedure of handling UE (100) behavior when the UE (100) is attached for emergency services. More specifically this disclosure defines the UE (100) behavior when the UE (100) is registered to a PLMN or two different PLMN via 3GPP access network and non-3GPP access network and UE (100) has is registered for emergency service over one of the 3GPP access network or non-3GPP access network.

12 Claims, 11 Drawing Sheets

(58) Field of Classification Search
CPC .. G08B 25/016; H04M 11/04; H04M 2242/04
See application file for complete search history.

(56) References Cited

U.S. PATENT DOCUMENTS

| | | | | |
|---|---|---|---|---|
| 10,004,054 | B2* | 6/2018 | Chen | H04W 76/18 |
| 10,057,927 | B2* | 8/2018 | Kiss | H04W 4/90 |
| 10,779,255 | B2* | 9/2020 | Bakker | H04W 60/00 |
| 2006/0045069 | A1* | 3/2006 | Zehavi | H04L 12/5692 370/352 |
| 2009/0061932 | A1* | 3/2009 | Nagarajan | H04M 1/724 455/558 |
| 2010/0297979 | A1* | 11/2010 | Watfa | H04W 8/205 455/404.1 |
| 2011/0038307 | A1* | 2/2011 | Madhavan | G07C 5/008 370/328 |
| 2011/0274012 | A1* | 11/2011 | Jang | H04W 36/14 370/259 |
| 2013/0035056 | A1* | 2/2013 | Prasad | H04W 12/062 455/404.1 |
| 2014/0256283 | A1* | 9/2014 | Lin | H04W 4/02 455/404.2 |
| 2015/0140948 | A1* | 5/2015 | Tiwari | H04W 4/90 455/404.1 |
| 2015/0281929 | A1* | 10/2015 | Shih | H04W 48/18 455/404.1 |
| 2016/0021521 | A1* | 1/2016 | Lee | H04W 88/06 455/404.1 |
| 2016/0119858 | A1* | 4/2016 | Liu | H04W 36/00837 455/434 |
| 2016/0205550 | A1* | 7/2016 | Rajadurai | H04W 8/082 455/411 |
| 2017/0005914 | A1* | 1/2017 | Edge | H04L 61/1511 |
| 2017/0006514 | A1* | 1/2017 | Kiss | H04L 45/745 |
| 2017/0013583 | A1* | 1/2017 | Chen | H04W 60/005 |
| 2017/0223492 | A1* | 8/2017 | Bitra | H04W 4/02 |
| 2017/0289883 | A1* | 10/2017 | Kiss | H04W 12/0433 |
| 2017/0332416 | A1* | 11/2017 | Kiss | H04L 61/304 |
| 2017/0366955 | A1* | 12/2017 | Edge | H04M 11/04 |
| 2018/0007588 | A1* | 1/2018 | Lin | H04W 76/15 |
| 2018/0302936 | A1* | 10/2018 | Feng | H04W 74/0833 |
| 2019/0182718 | A1* | 6/2019 | Shan | H04W 8/06 |
| 2019/0230556 | A1* | 7/2019 | Lee | H04W 28/16 |
| 2019/0253917 | A1* | 8/2019 | Dao | H04W 28/0268 |
| 2019/0254118 | A1* | 8/2019 | Dao | H04L 12/1407 |
| 2019/0297121 | A1* | 9/2019 | Qiao | H04L 61/2007 |
| 2019/0349816 | A1* | 11/2019 | Kiss | H04W 60/005 |
| 2019/0364412 | A1* | 11/2019 | Huang-Fu | H04W 4/90 |
| 2019/0394814 | A1* | 12/2019 | Bakker | H04W 4/90 |
| 2020/0120470 | A1* | 4/2020 | Arshad | H04W 36/0022 |
| 2020/0120551 | A1* | 4/2020 | Mukherjee | H04W 48/18 |
| 2020/0280948 | A1* | 9/2020 | Youn | H04W 76/12 |
| 2021/0084475 | A1* | 3/2021 | Kumar | H04W 76/50 |
| 2021/0267001 | A1* | 8/2021 | Takakura | H04W 48/16 |

FOREIGN PATENT DOCUMENTS

| | | | | |
|---|---|---|---|---|
| EP | 2747376 | A1 * | 6/2014 | ......... H04L 47/2408 |
| EP | 3346734 | A1 * | 7/2018 | .......... H04W 12/106 |
| WO | WO-2020003886 | A1 * | 1/2020 | ............ H04W 60/06 |
| WO | WO-2020074131 | A1 * | 4/2020 | .............. H04W 4/90 |

OTHER PUBLICATIONS

3rd Generation Partnership Project; Technical Specification Group Core Network and Terminals; Non-Access-Stratum (NAS) protocol for 5G System (5GS); Stage 3 (Release 15), 3GPP TS 24.501 V15.0.0, Jun. 2018, pp. 1-337.
"LS response on User Plane Security Policy", SA WG2, 3GPP TSG RAN WG2#101bis, R2-1804259, Apr. 16-20, 2018, 6 pages, Sanya, China.
"23.501: Editorial corrections and EN Removal", Nokia, Nokia Shanghai Bell (Rapporteur), 3GPP, SA WG2 Meeting # SA WG2 Meeting #124, S2-179619, Nov. 27-Dec. 1, 2017, pp. 1-159, Reno, Nevada, USA.
"Mobility inside 5GC and between 5GC and EPC for interworking scenarios", Qualcomm Incorporated, SA WG2 Meeting #S2-119, S2-170743, Feb. 13-17, 2017, pp. 1-6, Dubrovnik, Croatia.
"TS 23.501: Editorial corrections and alignment", Nokia, Nokia Shanghai Bell (Rapporteur), SA WG2 Meeting #123, S2-176891, pp. 1-7, Oct. 23-27, 2017, Ljubljana, Slovenia.
International Search Report for PCT/JP2019/021667 dated Aug. 6, 2019 (PCT/ISA/210).
Written Opinion for PCT/JP2019/021667 dated Aug. 6, 2019 (PCT/ISA/237).
Extended European Search Report for EP Application No. EP19825838.6 dated Jul. 7, 2021.
3GPP TS 23.501 V15.2.0 (Jun. 2018), Technical Specification Group Services and System Aspects, "System Architecture for the 5G System", Stage 2, (Release 15), Jun. 19, 2018 (Jun. 19, 2018), pp. 1-216.
3GPP TS 23.502 V1.3.0 (Nov. 2017), Technical Specification Group Services and System Aspects, "Procedures for the 5G System", Stage 2 (Release 15), Nov. 14, 2017 (Nov. 14, 2017), pp. 1-215.
NEC, "Clarification to the UE's behavior of emergency registered UE", 3GPP TSG-SA WG2 Meeting #128, S2-187334, Jul. 2-6, 2018, Lithuania.
Japanese Office Action for JP Application No. 2020-570081 dated Feb. 22, 2022 with English Translation.
NEC, Clarification to the UE's behavior of emergency registered UE [online], 3GPP TSG SA WG2 #128 S2-186756, Jun. 26, 2018.
Telecom Italia, Lack of S-NSSAI or DNN in the PDU Session Establishment Request [online], 3GPP TSG SA WG2 #127 S2-184259, Apr. 20, 2018.

* cited by examiner

UE BEHAVIOR WHEN THE DEVICE IS ATTACHED FOR EMERGENCY SERVICE

CROSS REFERENCE TO RELATED APPLICATIONS

This application is a National Stage of International Application No. PCT/JP2019/021667 filed May 31, 2019, claiming priority based on Indian Patent Application No. 201811023556 filed Jun. 25, 2018, the disclosure of which is incorporated herein in its entirety by reference.

TECHNICAL FIELD

The present disclosure is related to a User Equipment (UE) behavior when the device is attached for emergency services.

BACKGROUND ART

In the 5GS, a UE supporting 3rd Generation Partnership Project (3GPP) access and Non-3GPP access can register to a Public Land Mobile Network (PLMN) or to two different PLMN via 3GPP access and non-3GPP access at the same time. When the UE is registered to a PLMN or equivalent PLMN over 3GPP access network (e.g. Next Generation-Radio Access Network (NG-RAN), g Node B (gNB) and non-3GPP access network (e.g. Wifi access point) then the UE is registered to the same Access Management Function (AMF) i.e. the 3GPP access network and the non-3GPP access network are connected to the same AMF. When the UE is registered to two non-equivalent PLMNs, one over 3GPP access and the other one over non-3GPP access then the UE is registered to two different AMFs i.e. one AMF belongs to a first PLMN and another AMF belongs to a second PLMN. The Registration Management contexts of a UE for a 3GPP access and a non-3GPP access are different.

The UE establishes the Protocol Data Unit (PDU) session for emergency service to make emergency call. The UE is considered as attached for emergency services when the UE has only PDU session for emergency service(s) when the UE is registered and in normal service state or in limited service state, or the UE has performed emergency registration procedure successfully. When the UE is registered for emergency service then the UE is not allowed access normal service. It must de-register and register to get a normal service.

SUMMARY OF INVENTION

Technical Problem

When a UE is registered to a PLMN or to two different PLMNs, one over a 3GPP access and the other one over non-3GPP access and the UE is emergency registered over one of the two access network, in this scenario the UE is not allowed to activate PDU session for normal services i.e. non-emergency service (e.g. IoT, URLCC or browsing) neither over 3GPP access nor over non-3GPP access in accordance with the latest 3GPP specifications. This architecture design restricts user services unnecessarily even though the UE can access the normal services via the other access network than the one used for emergency registered by establishing a non-emergency PDU session without influencing to the emergency service ongoing.

Solution to Problem

A method for a UE according to a first aspect of the present disclosure includes performing registration procedure to a second Public Land Mobile Network (PLMN) over a second access network for a non-emergency service when the UE is registered for an emergency service to a first PLMN over a first access network, and establishing a Protocol Data Unit (PDU) session for the non-emergency service to the second PLMN over the second access network.

DESCRIPTION OF EMBODIMENTS

Figure 1:
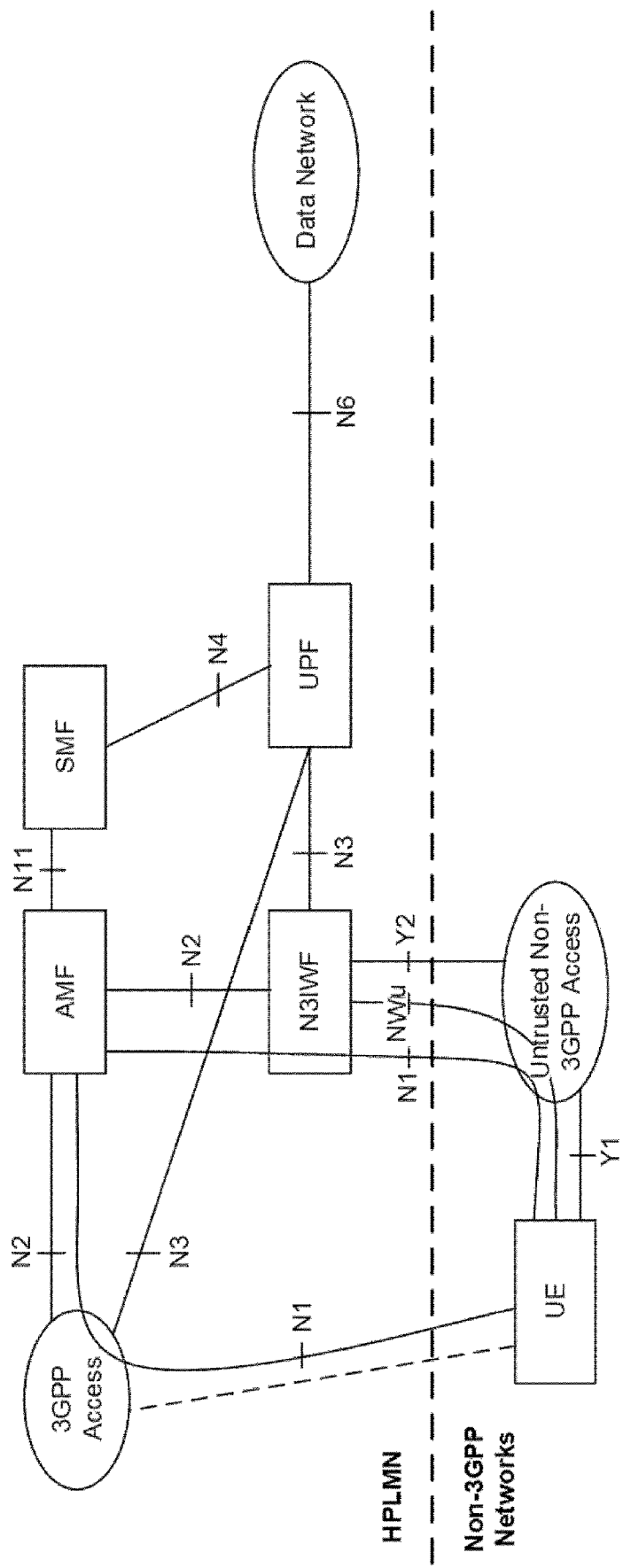
FIG. 1 illustrates 3GPP and non-3GPP architecture of 5GS when 3GPP access and non-3GPP access connected to the same AMF.

For the purposes of the present document, the abbreviations given in TR 21.905 and the following apply. An abbreviation defined in the present document takes precedence over the definition of the same abbreviation, if any, in TR 21.905.

5GC 5G Core Network
5GS 5G System
5G-AN 5G Access Network
5G-GUTI 5G Globally Unique Temporary Identifier
5G S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CP Control Plane
CM Connection Management
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate GMLC Gateway Mobile Location Centre
GMSC Gateway Mobile Services Switching Center
GPSI Generic Public Subscription Identifier
GUAMI Globally Unique AMF Identifier
HR Home Routed (roaming)
I-RNTI I-Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
MNRF Mobile Station Not Reachable Flag
MO Mobile Originated
MT Mobile Terminated
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
SMS Short Message Service
SMSF SMS Function
S-NSSAI Single Network Slice Selection Assistance Information
SSC Session and Service Continuity
SST Slice/Service Type
SUCI Subscription Concealed Identifier
SUPI Subscription Permanent Identifier
UDM Unified Data Management
UDSF Unstructured Data Storage Function
UL Uplink
UL CL Uplink Classifier
UPF User Plane Function
UDR Unified Data Repository
URSP UE Route Selection Policy
SMS Short Message Service
SMSF SMS Function Definitions For the purposes of the present document, the terms and definitions given in 3GPP TR 21.905, 3GPP TS 24.501 and the following apply. A term defined in the present document takes precedence over the definition of the same term, if any, in 3GPP TR 21.905 and in 3GPP TS 24.501.

First Aspect (Solution 1 Solves Problematic Statement 1)

Figure 2:
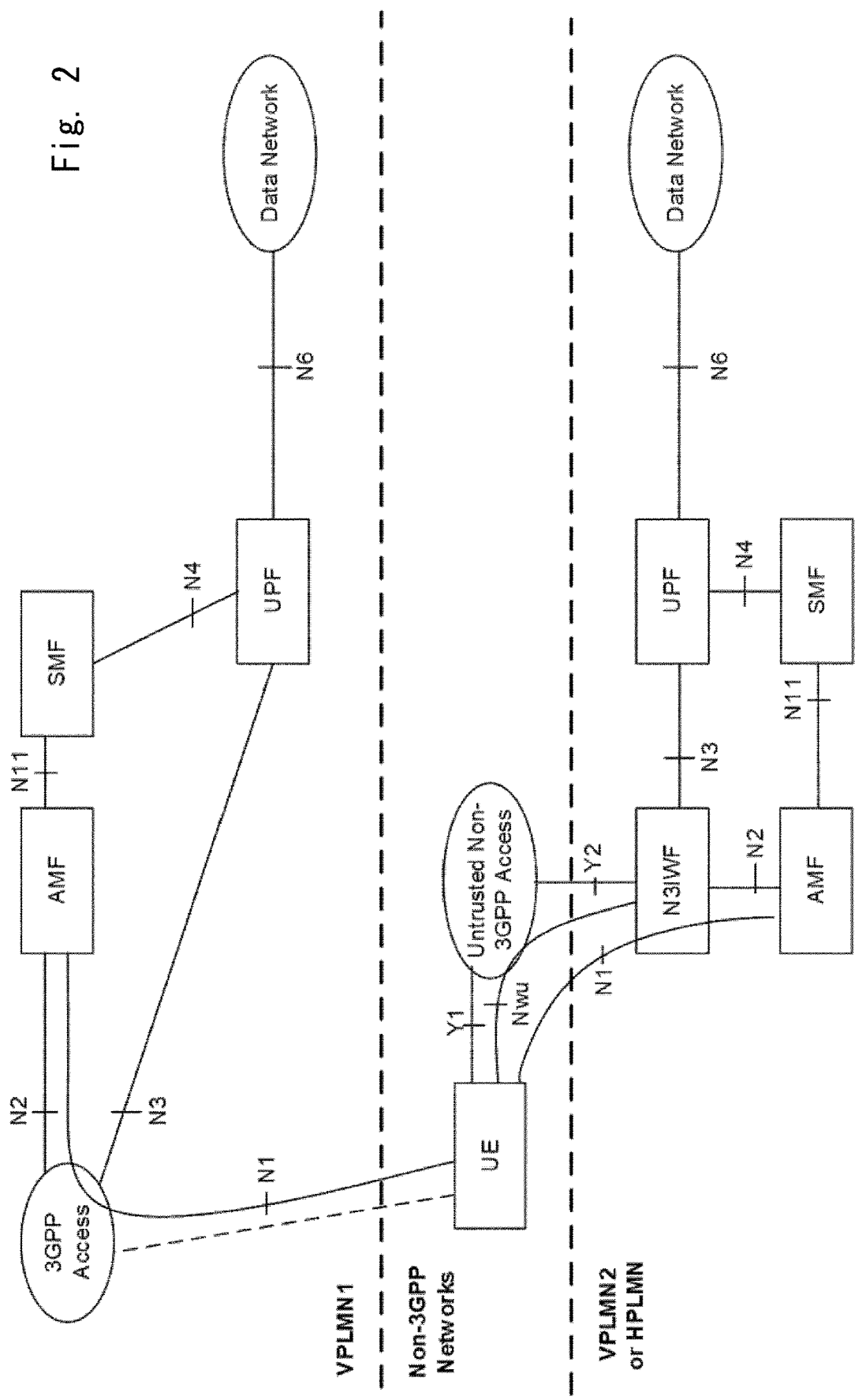
FIG. 2 illustrates 3GPP and non-3GPP architecture of 5GS when 3GPP access and non-3GPP access connected to the different AMF.
Figure 3:
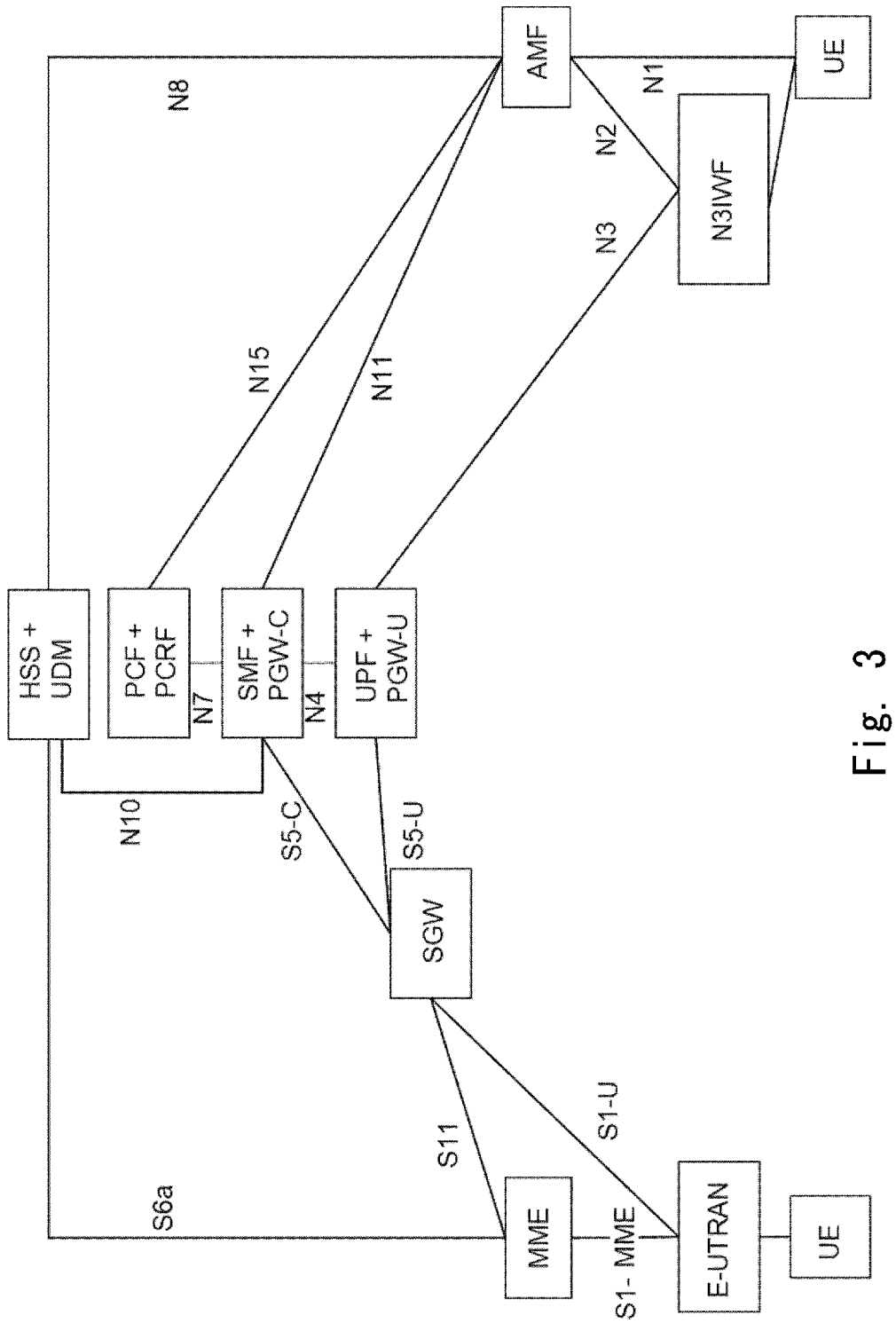
FIG. 3 illustrates Home-routed roaming architecture for interworking between 5GS and EPC/E-UTRAN.

FIG. 1, FIG. 2 and FIG. 3 are given as a reference architectures as they are referred by some scenarios that this aspect deals with.

When a UE is emergency registered over one access network then it does not affect the service over another access network.

The outline of this solutions are mentioned below.

1. A UE is emergency registered over a first access network to a PLMN if it has successfully completed initial registration for emergency services over the first access network to the PLMN or if it has only one PDU session established over the first access network which is for emergency services. When the UE is registered for emergency service over the first access network then the UE is not allowed to access a non-emergency service i.e. normal service (e.g. browsing to internet, Internet of Things, Machine to Machine communication for industrial use) over the first access network.

In order for the UE to have non-emergency services, the UE performs de-registration procedure first access network then the UE registers over the first access network to the PLNMN to get a non-emergency service i.e. normal service over the first access network.

2. When the UE is emergency registered over a first access network to a PLMN then it does not affect the normal services over a second access network to the same PLMN or to the non-equivalent PLMN i.e. the UE accesses to the Data Network (DN) providing a non-emergency service or a normal service to the UE over the second access network through the same PLMN to which the UE is registered for emergency service or through another PLMN which is not equivalent to the PLMN to which the UE is registered for emergency service. When the UE is registered for emergency service over the first access network, the UE can take the following actions.

2.1 The UE can perform registration procedure to a PLMN over the second access network for a non-emergency service i.e. normal service. After successful registration procedure the UE establishes a PDU session for non-emergency service to the same PLMN or another PLMN over the second access network. After the PDU session establishment for the non-emergency services the UE transmits and receives data related to this PDU session.

2.2 If the UE is already registered to another PLMN over second access network, then the UE establishes the PDU session for non-emergency service upon the request from upper layer. After the successful establishment of this PDU session the UE can transmit or receive data related to this PDU session.

2.3. If the UE is already registered over the second access network to another PLMN and the UE already has PDU session for non-emergency service over another PLMN then the UE can establishes user plane related to this PDU session. After the PDU session is successfully established then the UE can transmits and receives data related to this PDU session over the user plane.

2.4. The UE shall not perform emergency registration procedure over the second access network. If the AMF receives the Registration request message indicating it as Emergency Registration over the second access network while the UE has been registered for emergency service over the first access network, the AMF rejects the Registration request message with an appropriate cause value indicating UE that second emergency registration is not allowed.

2.5. The UE may initiates emergency registration over the second access network. This may happen when the UE is moving out of the coverage for the first access network while the second access network becomes available. For example, the UE moves down to the subway station with emergency service over the 3GPP access network and loses the 3GPP access due to lack of 3GPP radio coverage while WiFi as non-3GPP access network becomes available. Or the UE may initiates a brand new Emergency requisition procedure over the second access network. In this case the UE may use explicit NAS information element indicating that this is an independent Emergency registration request in addition to the existing Emergency service.

If the AMF receives the Registration request message indicating it as Emergency Registration over the second access network while the UE has been registered for emergency service over the first access network, the AMF has several options.

Option A: the UE performs PDU Session Establishment procedure for Emergency service with the PDU Session ID that is used for the Emergency service over the first access network in order to move the PDU Session from first access network to second access network. In this case, the Handover of a PDU Session procedure between 3GPP and untrusted non-3GPP access or Handover of a PDU Session procedure from 3GPP to untrusted non-3GPP access (non-roaming and roaming with local breakout) is performed.

Option B: the UE performs PDU Session Establishment procedure for Emergency service without the PDU Session ID that is used for the Emergency service over the first access network. The UE may use explicit NAS information element indicating that this is an independent PDU session establishment request for emergency service. This procedure is used for the scenario where the UE needs to initiate a brand new Emergency service over the second access network. In this case, after successful emergency registration procedure over the second access network, the AMF may initiate the Network-initiated Deregistration procedure to the PDU Session(s) that are over the first access network in order to release them. Or the network i.e. 5GS handles two emergency services one over the first access network and the other one over the second access network at the same time.

The detailed UE behavior when the UE is registered for emergency service to a PLMN over one access network when the UE supports registration to a second PLMN over another access network is given below.

Figure 4:
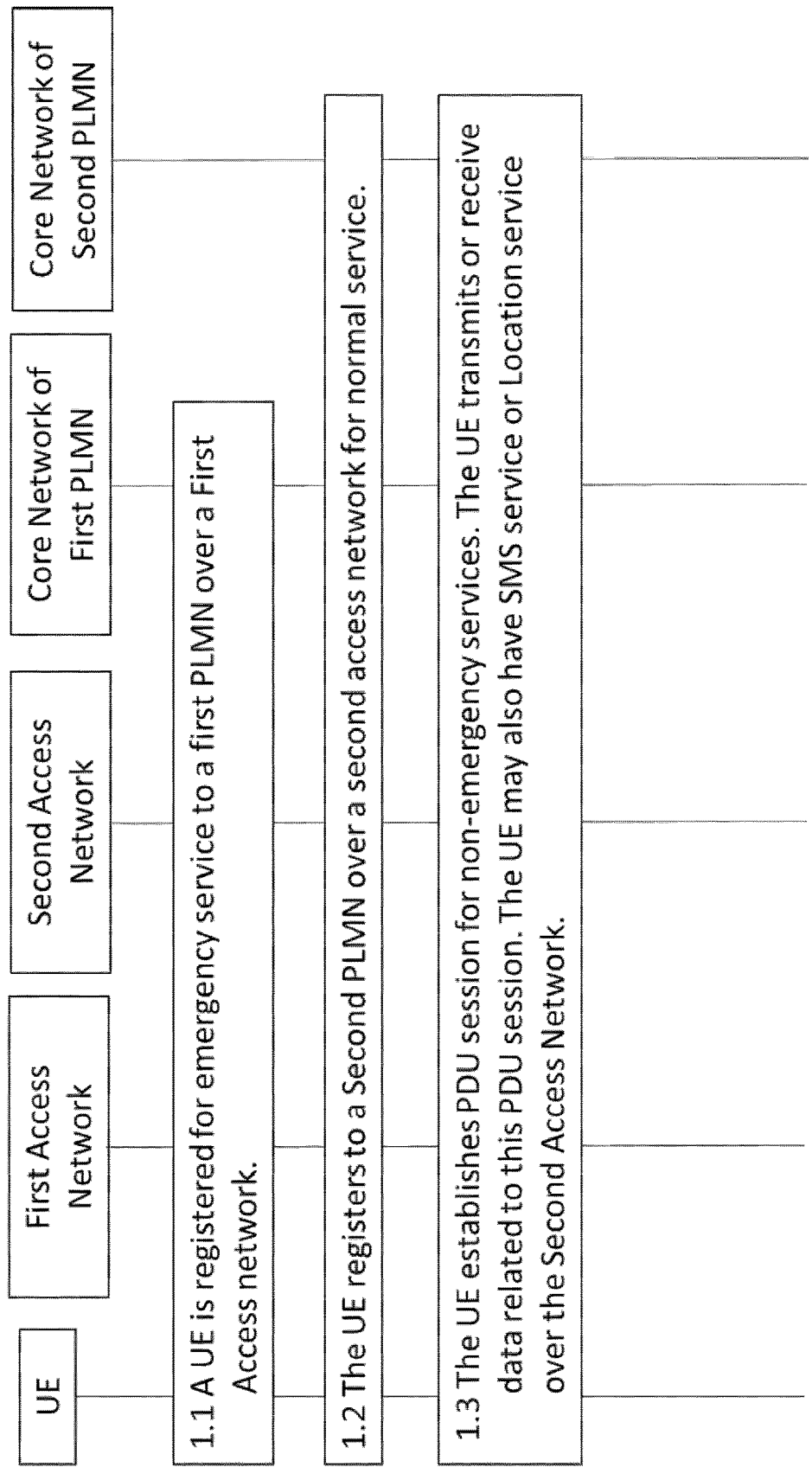
FIG. 4 illustrates Procedure to access non-emergency service over another access network when the UE is emergency registered over another access network.

Scenario 1:

FIG. 4 illustrates Procedure to access non-emergency service over another access network when the UE is emergency registered over another access network.

1.1 A UE is registered for an emergency service to a first PLMN over a first Access Network (AN).

1.2 The UE performs registration procedure to a second PLMN over the second access network for a non-emergency service i.e. normal service.

1.3 After successful registration procedure the UE establishes a PDU session for non-emergency services to the second PLMN over the second access network. After the PDU session establishment for the non-emergency services the UE transmits and receives data related to this PDU session. This UE behavior of the step 1.3 may be also denoted as the following descriptions, i.e. the UE establishes the PDU session for non-emergency service to the second PLMN over the second access network, in a case where at least one of the following conditions are met:

(a) the UE supports the first access network (e.g. 3GPP access) and the second network (e.g. Non-3GPP access) and registration to a PLMN or to two different PLMN via the first access network and the second network at the same time, (b) the UE has registered to the PLMN or to the two different PLMN via the first access network and the second network at the same time.

The UE may also have SMS service or Location service over the Second Access Network.

Figure 5:
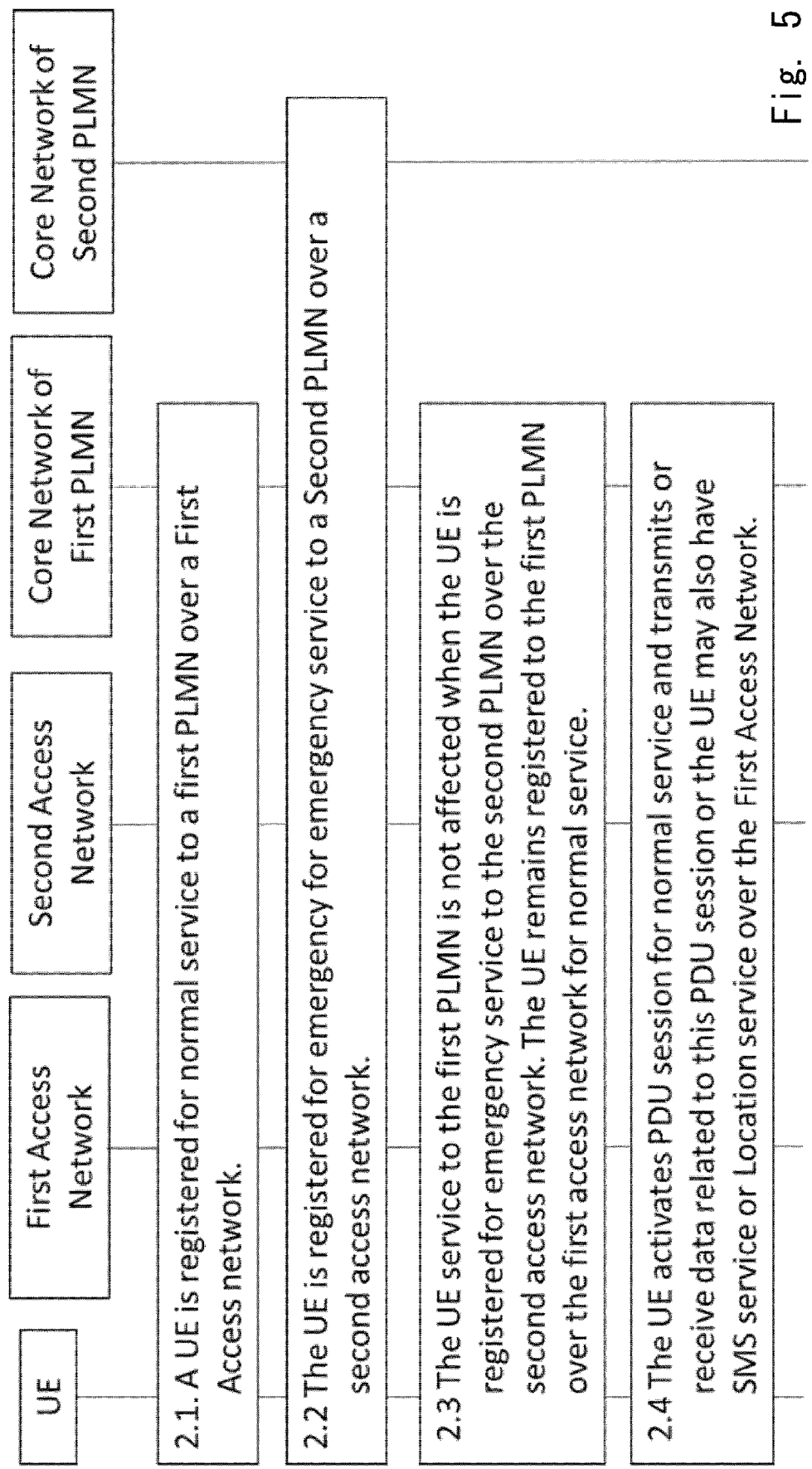
FIG. 5 illustrates Procedure to access non-emergency service over another access network when the UE is emergency registered over another access network.

Scenario 2:

FIG. 5 illustrates Procedure to access non-emergency service over another access network when the UE is emergency registered over another access network.

2.1 A UE is registered for a normal service to a first PLMN over a first Access Network (AN).

2.2 The UE is registered for an emergency service to a second PLMN over a second access network.

2.3. After the UE is registered for emergency service to the second PLMN over the second access network, the UE is still registered to the first PLMN over the first Access network for normal service i.e. the emergency registration to the second PLMN over the second access network does not affect the normal service. The UE is accessing from the first PLMN over the first access network. In this scenario the UE performs following procedure:

2.4 The UE have the following user services as examples.

(1) On request from upper layer, the UE establishes PDU session for normal service to the first PLMN over the first access network and transmits and receive data related to this PDU session.

(2) If a PDU session for a normal service has already been established over to the first PLMN then UE establishes the user plane to this PDU session to receive and transmits data on request from upper layer to establish the user plane for this PDU session.

(3) UE has SMS service or Location service over the first access network.

For both Scenario 1 and 2:

The following cases are valid for both Scenario 1 and 2.

(1) In one example of the scenario 1 and 2, the first PLMN and the second PLMN are same and consists of 5GS. The first access network and second access network are 3GPP access and non-3GPP access. The first access network and second access network are always different type of access network i.e. if the first access network is a 3GPP access then the second access network is a non-3GPP access or if the first access network is a non-3GPP access then the second access network is a 3GPP access. In this case the first access network and the second access network are connected to the same AMF. This architecture is given in the FIG. 1.

(2) In another example of the scenario 1 and 2, the first PLMN and the second are non-equivalent PLMNs. The first access network and second access network are always different type of access network i.e. if the first access network is a 3GPP access then the second access network is a non-3GPP access or if the first access network is a non-3GPP access then the second access network is a 3GPP access. In this case the first access network and the second access network are connected to two different AMFs (one AMF is the AMF of the first PLMN and second AMF is the AMF of the second PLMN). This architecture is given in the FIG. 2.

(3) In another example of the scenario 1 and 2, the UE and the network support Dual Registration procedure. The first PLMN and the second PLMN are same or equivalent PLMNs and consists of 5GS and EPS respectively. The first access network is gNB or non-3GPP access connected to AMF and the second access network is ng-eNB or eNB connected to EPC. This architecture is given in FIG. 3.

(4) If the UE performs deregistration procedure over an access network to the network to which the UE is registered for emergency services then it does not affect the normal services over another access network over which the UE is registered for the normal services i.e. the UE is still registered for normal service over another access network, the UE can establish the PDU session over another access network or some data transfer is ongoing over the another access network then the data transfer continues over another access network.

(5) If the UE is registered to the same AMF over 3GPP access and non-3GPP access (registered for emergency services over one access network and registered for normal services over another access network) then the UE shall not delete common NAS parameters e.g. (5G-GUTI, 5G NAS security context parameters, equivalent PLMN) when the UE performs deregistration procedure over an access network over which the UE is registered for emergency services. The UE keeps using the common parameters over second access network over which the UE is registered for the normal service.

The above step 2.4 may be also denoted as the following descriptions, i.e. the UE have the above user services, in a case where at least one of the following conditions are met:

(a) the UE supports the first access network (e.g. 3GPP access) and the second network (e.g. Non-3GPP access) and registration to a PLMN or to two different PLMN via the first access network and the second network at the same time, (b) the UE has registered to the PLMN or to the two different PLMN via the first access network and the second network at the same time.

Figure 6:
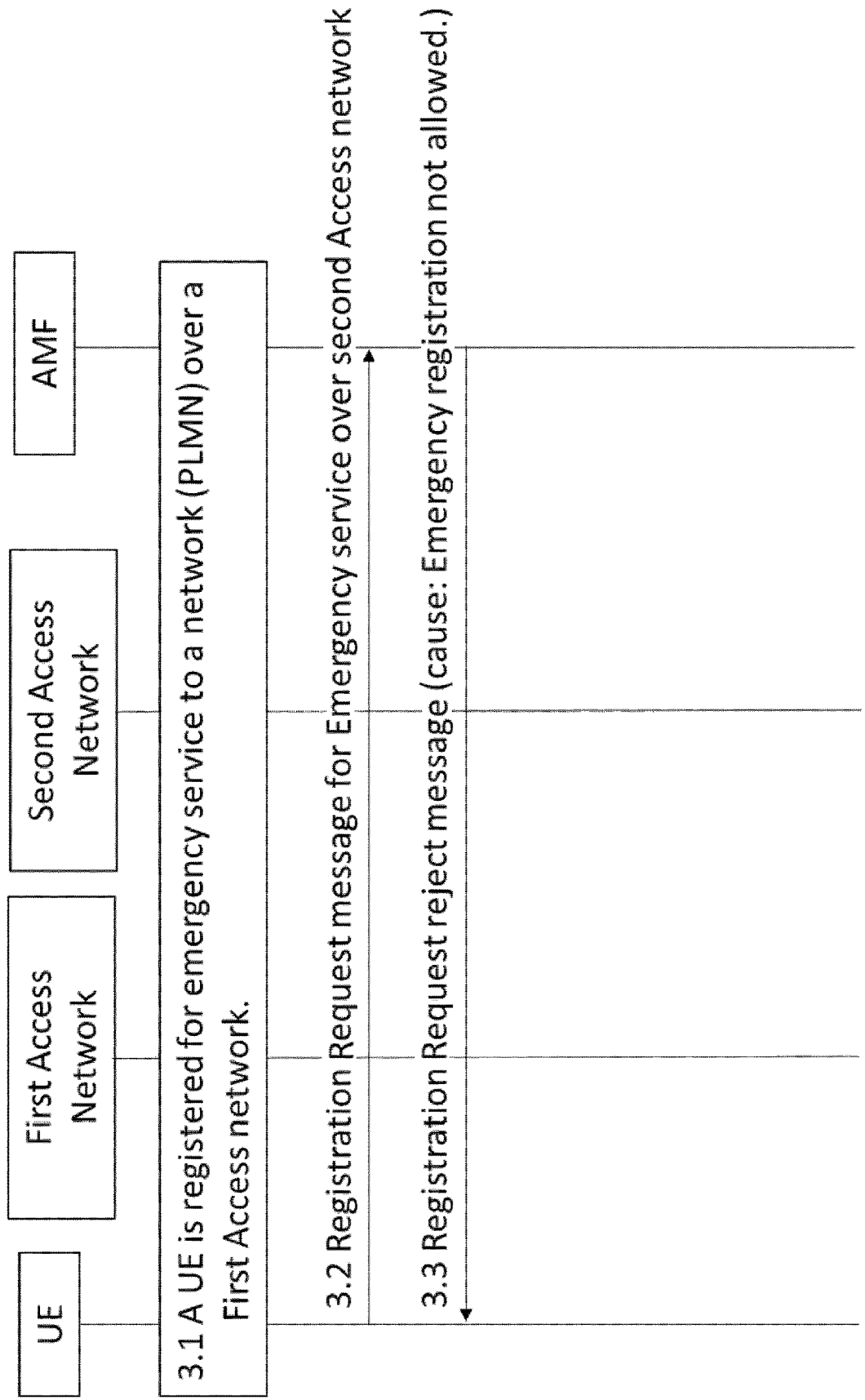
FIG. 6 illustrates Procedure to access emergency service over another access network when the UE is emergency registered over another access network.

Scenario 3:

FIG. 6 illustrates Procedure to access emergency service over another access network when the UE is emergency registered over another access network.

3.1 A UE is registered for an emergency service over a first Access Network (AN).

3.1 A UE is registered for an emergency service over a first Access Network (AN).

3.2 The UE sends the Registration request message indicating it as Emergency Registration to the AMF over the second access network.

3.3 The AMF rejects the Registration Request message by sending the Registration Reject message to the UE with cause "Emergency registration is not allowed" or "Emergency registered already".

When the UE receives the Registration Reject message from the AMF, then the UE shall not sends any Registration request message for Emergency over the second access network until the Emergency service over the first access network ends i.e. the UE detaches from the 5GS for Emergency service over the first access network. However, the UE may send any Registration request message for non-Emergency for normal services over the second access network regardless of a registration status over the first access network.

In case a UE is registered for an emergency service over a first Access Network but no PDU session is established, for example due to network congestion, then the AMF may accept the Registration request message from the UE indicating it as Emergency Registration in order to provide an Emergency service to the UE over the second access network. If the Emergency Registration procedure is successful and associated PDU sessions has been established over the second access network, then the AMF may initiate the Network-initiated Deregistration procedure to the UE over the first access network.

Figure 7:
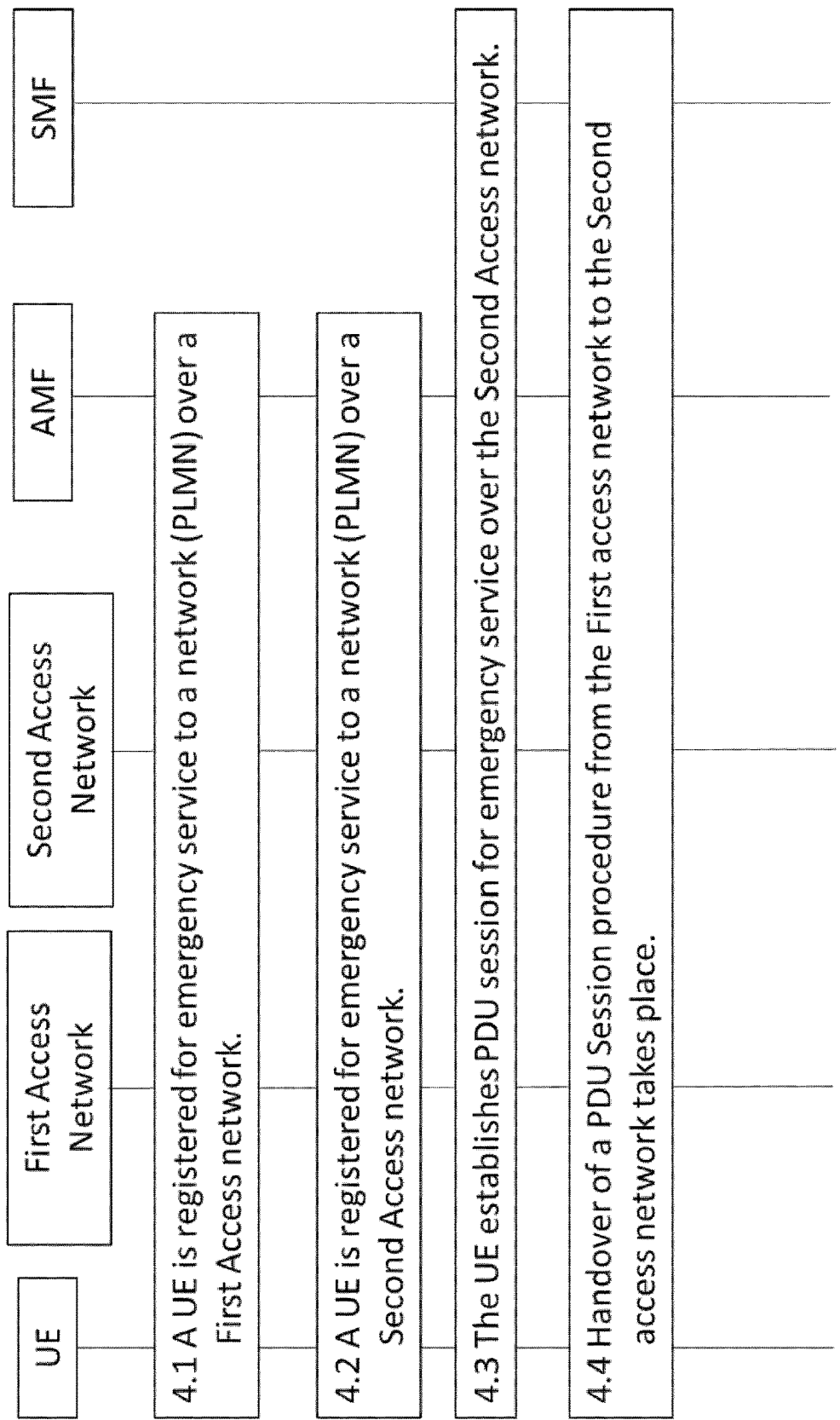
FIG. 7 illustrates Procedure to access emergency service over another access network when the UE is emergency registered over another access network.

Scenario 4:

FIG. 7 illustrates Procedure to access emergency service over another access network when the UE is emergency registered over another access network.

Although the FIG. 7 has only one AMF shown as the common AMF for both access networks, this scenario is also valid to a situation where there are two AMFs involved, one AMF for an emergency service attached over a first Access Network and the other AMF for an emergency service attached over a second access Network.

4.1 A UE is registered for an emergency service over a first Access Network (AN). The UE establishes a PDU session(s) for an emergency service over the first Access Network.

4.2 UE is registered for an emergency service over a second Access Network (AN) after successful Emergency Registration procedure to the same PLMN over a first Access Network. The UE does not have a PDU session(s) for an emergency service(s).

4.3 After successful registration procedure the UE establishes a PDU session for emergency service over the second access network. The UE may establish the same PDU session(s) with the PDU session(s) over the first access network so that all sessions can be transferred to the PDU session(s) over the second access network.

4.4 Handover of a PDU Session procedure from the First access network to the Second access network takes place. This procedure can be either the Handover of a PDU Session procedure between 3GPP and untrusted non-3GPP access or the Handover of a PDU Session procedure from 3GPP to untrusted non-3GPP access (non-roaming and roaming with local breakout) as described in the 3GPP TS 23.502.

All or some Emergency service can be transferred to new PDU session(s) over the second access network so that emergency service can be continues even the UE loses the radio contact to the 5GS over the first access network.

Figure 8:
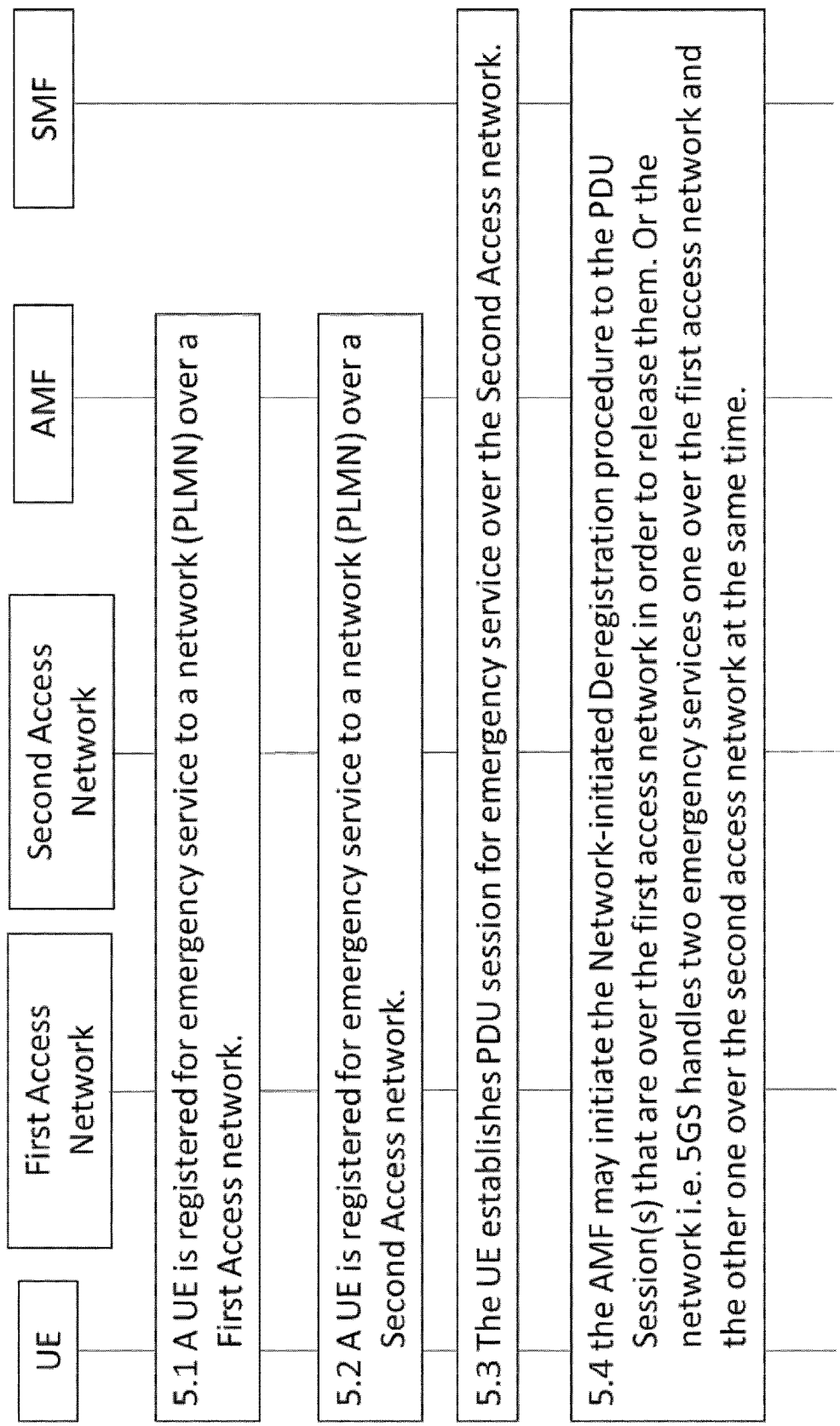
FIG. 8 illustrates Procedure to access emergency service over another access network when the UE is emergency registered over another access network.

Scenario 5:

FIG. 8 illustrates Procedure to access emergency service over another access network when the UE is emergency registered over another access network.

Although the FIG. 8 has only one AMF shown as the common AMF for both access networks, this scenario is also valid to a situation where there are two AMFs involved, one AMF for an emergency service attached over a first Access Network and the other AMF for an emergency service attached over a second access Network.

5.1 A UE is registered for an emergency service over a first Access Network (AN).

5.2 UE is registered for an emergency service over a second Access Network (AN) after successful Emergency Registration procedure to the same PLMN over a second Access Network.

5.3 After successful registration procedure the UE establishes a PDU session for emergency service over the second access network.

5.4 The AMF may initiate the Network-initiated PDU session release procedure to the PDU Session(s) that are over the first access network to release them. Or the network i.e. 5GS handles two emergency services one over the first access network and the other one over the second access network at the same time.

Scenario 4 and 5 applies to the scenario described in FIG. 1, 2 or 3.

User Equipment (UE)

Figure 9:
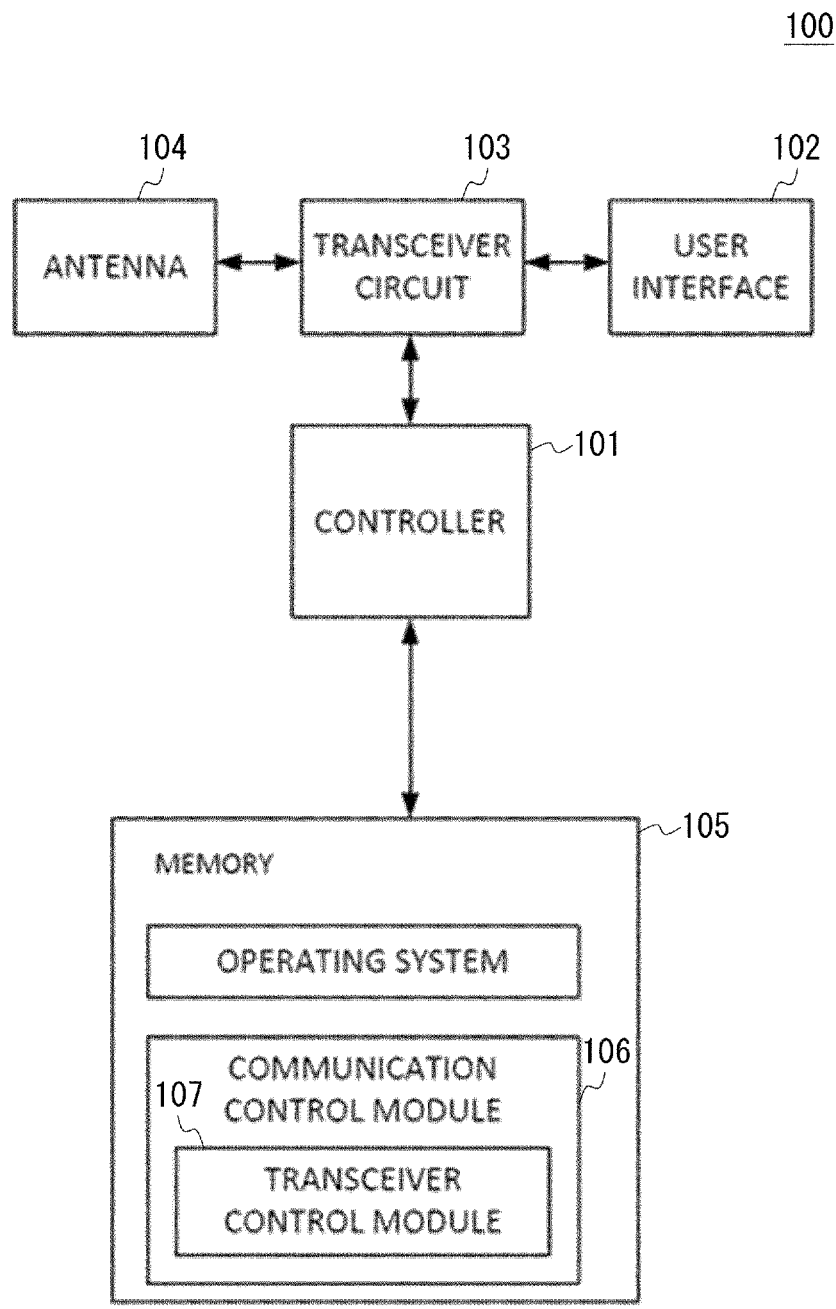
FIG. 9 illustrates general block diagram for UE.

FIG. 9 is a block diagram illustrating the main components of the UE (100). As shown, the UE (100) includes a transceiver circuit (103) which is operable to transmit signals to and to receive signals from the connected node(s) via one or more antenna (104). Although not necessarily shown in FIG. 9, the UE will of course have all the usual functionality of a conventional mobile device (such as a user interface (102)) and this may be provided by any one or any combination of hardware, software and firmware, as appropriate. Software may be pre-installed in the memory and/or may be downloaded via the telecommunication network or from a removable data storage device (RMD), for example.

A controller (101) controls the operation of the UE (100) in accordance with software stored in a memory (105). The software includes, among other things, an operating system and a communications control module (106) having at least a transceiver control module (107). The communications control module (106) (using its transceiver control sub-module) is responsible for handling (generating/sending/receiving) signalling and uplink/downlink data packets between the UE (100) and other nodes, such as the base station/(R)AN node, the MME, the AMF (and other core network nodes). Such signalling may include, for example, appropriately formatted signalling messages relating to connection establishment and maintenance (e.g. RRC connection establishment and other RRC messages), periodic location update related messages (e.g. tracking area update, paging area updates, location area update) etc. Such signalling may also include, for example, broadcast information (e.g. Master Information and System information) in a receiving case.

(R)AN Node

Figure 10:
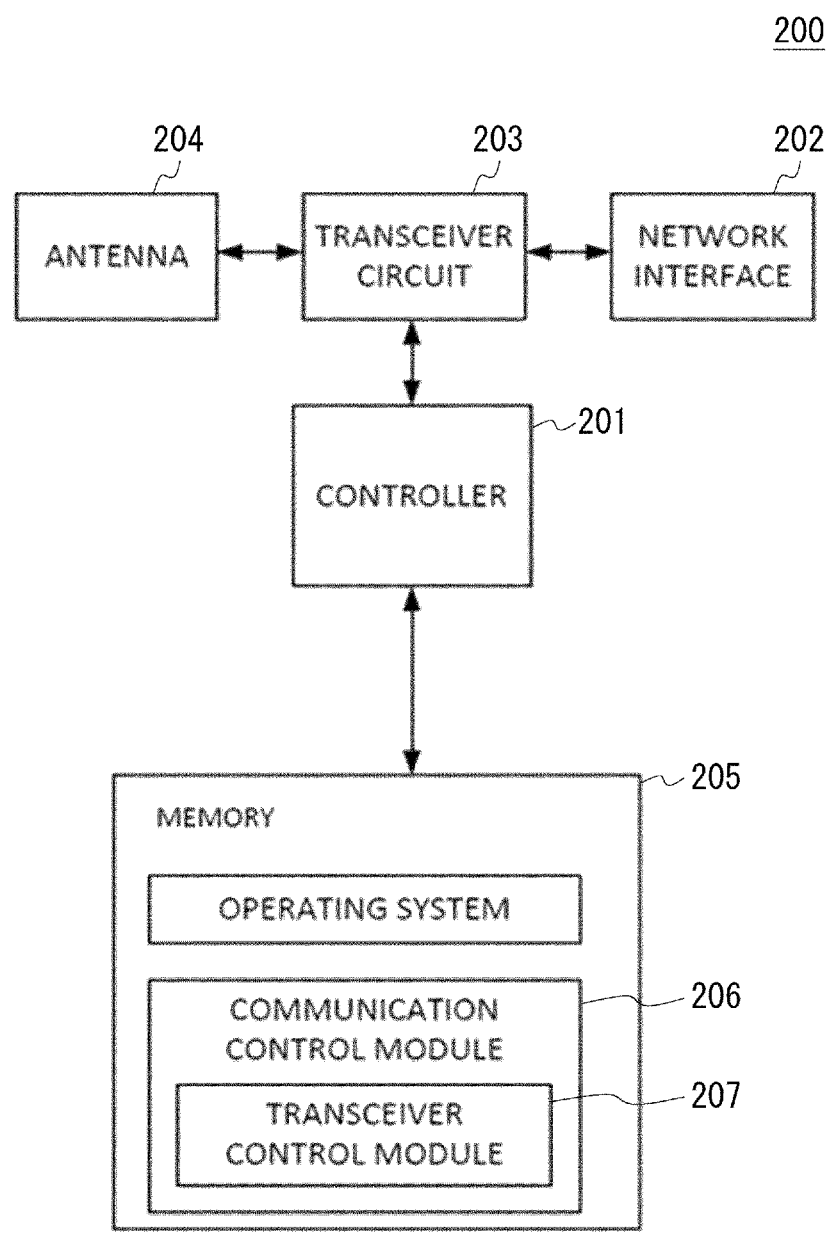
FIG. 10 illustrates general block diagram for (R)AN.

FIG. 10 is a block diagram illustrating the main components of an exemplary (R)AN node (200), for example a base station ('eNB' in LTE, 'gNB' in 5G) or an access point (e.g. wifi AP). As shown, the (R)AN node (200) includes a transceiver circuit (203) which is operable to transmit signals to and to receive signals from connected UE(s) via one or more antenna (204) and to transmit signals to and to receive signals from other network nodes (either directly or indirectly) via a network interface (202). A controller (201) controls the operation of the (R)AN node (200) in accordance with software stored in a memory (205). Software may be pre-installed in the memory (205) and/or may be downloaded via the telecommunication network or from a removable data storage device (RMD), for example. The software includes, among other things, an operating system and a communications control module (206) having at least a transceiver control module (207).

The communications control module (207) (using its transceiver control sub-module) is responsible for handling (generating/sending/receiving) signalling between the (R)AN node (200) and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller (201) is also configured (by software or hardware) to handle related tasks such as, when implemented, UE mobility estimate and/or moving trajectory estimation.

AMF

Figure 11:
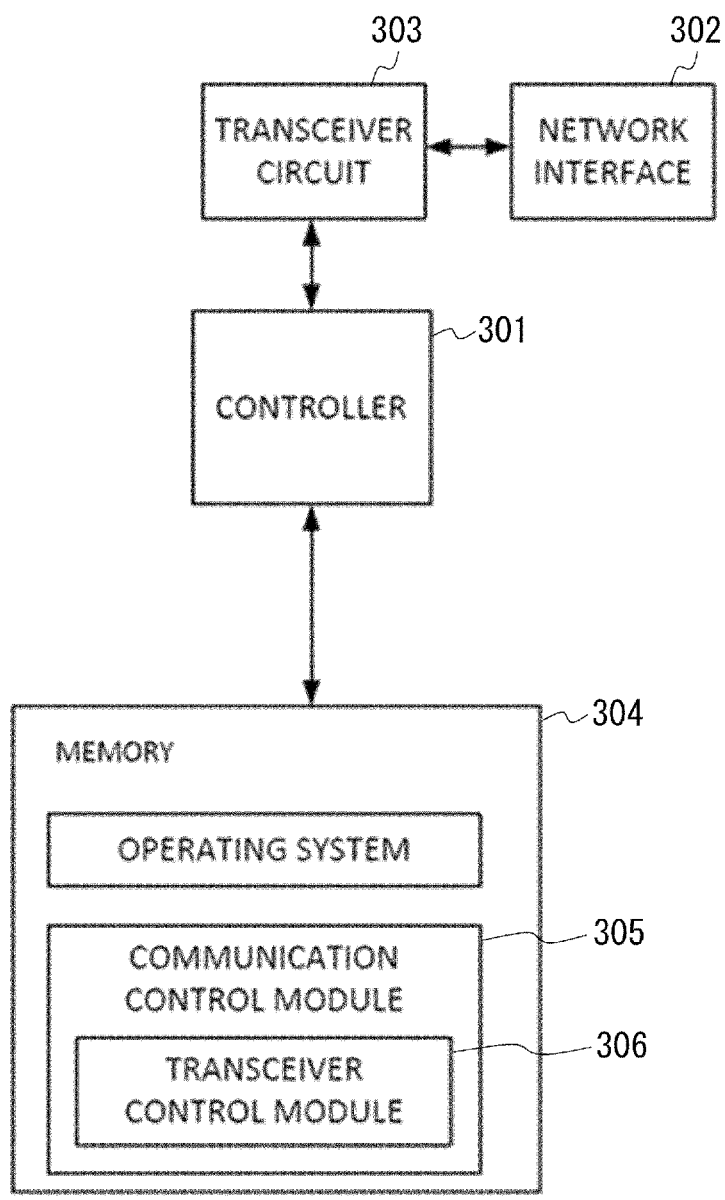
FIG. 11 illustrates general block diagram for AMF.

FIG. 11 is a block diagram illustrating the main components of the AMF (300). The AMF (300) is included in the 5GC. As shown, the AMF (300) includes a transceiver circuit (303) which is operable to transmit signals to and to receive signals from other nodes (including the UE) via a network interface (302). A controller (301) controls the operation of the AMF (300) in accordance with software stored in a memory (304). Software may be pre-installed in the memory (304) and/or may be downloaded via the telecommunication network or from a removable data storage device (RMD), for example. The software includes, among other things, an operating system and a communications control module (305) having at least a transceiver control module (306).

The communications control module (305) (using its transceiver control sub-module) is responsible for handling (generating/sending/receiving) signalling between the AMF (300) and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

REFERENCE SIGNS LIST

100 UE
101 controller
102 user interface
103 transceiver circuit
104 antenna
105 memory
106 communication control module
107 transceiver control module
200 (R)AN node
201 controller
202 network interface
203 transceiver circuit
204 antenna
205 memory
206 communication control module
207 transceiver control module
300 AMF
301 controller
302 network interface
303 transceiver circuit
304 memory
305 communication control module
306 transceiver control module

The invention claimed is:

1. A method of a User Equipment (UE), the method comprising:
   performing registration procedure to a Public Land Mobile Network (PLMN) over a second access network for a non-emergency service through an Access and Mobility Management Function (AMF) in a case where the UE is registered through the AMF for an emergency service to the PLMN over a first access network; and
   establishing a Protocol Data Unit (PDU) session for the non-emergency service to the PLMN over the second access network,
   wherein one of the first access network and the second access network is a 3GPP access network, and the other of the first access network and the second access network is a non-3GPP access network.

2. A method of a User Equipment (UE), the method comprising:
   performing registration procedure to a Public Land Mobile Network (PLMN) over a first access network for a first emergency service through an Access and Mobility Management Function (AMF);
   establishing a first Protocol Data Unit (PDU) session for the first emergency service over the first access network;
   performing registration procedure to the PLMN over a second access network for a second emergency service through the AMF in a case where the UE is registered for the first emergency service to the PLMN over the first access network and the second access network becomes available;
   establishing a second PDU session for the second emergency service over the second access network; and
   performing handover of a PDU session procedure from the first access network to the second access network after establishing the second PDU session for the second emergency service.

3. The method according to claim 2,
   establishing the first PDU session through a Session Management Function (SMF); and
   establishing the second PDU session through the SMF.

4. The method according to claim 2,
   wherein the second PDU session is established with a PDU Session ID, and
   wherein the PDU Session ID is used for establishing the first PDU session.

5. The method according to claim 2, further comprising:
   using a PDU Session ID of the first PDU session to be moved to the second access network in case of establishing the second PDU session.

6. The method according to claim 2, further comprising:
   using a PDU Session ID of the first PDU session in case of establishing the second PDU session.

7. A User Equipment (UE) comprising:
   a memory; and
   at least one hardware processor coupled to the memory, wherein the at least one hardware processor is configured to:
      perform registration procedure to a Public Land Mobile Network (PLMN) over a second access network for a non-emergency service through an Access and Mobility Management Function (AMF) in a case where the UE is registered through the AMF for an emergency service to the PLMN over a first access network; and
      establish a Protocol Data Unit (PDU) session for the non-emergency service to the PLMN over the second access network,
      wherein one of the first access network and the second access network is a 3GPP access network, and the other of the first access network and the second access network is a non-3GPP access network.

8. A User Equipment (UE) comprising:
   a memory; and
   at least one hardware processor coupled to the memory, wherein the at least one hardware processor is configured to:
      perform registration procedure to a Public Land Mobile Network (PLMN) over a first access network for a first emergency service through an Access and Mobility Management Function (AMF);
      establish a first Protocol Data Unit (PDU) session for the first emergency service over the first access network;
      perform registration procedure to the PLMN over a second access network for a second emergency service through the AMF in a case where the UE is registered for the first emergency service to the PLMN over the first access network and the second access network becomes available;
      establish a second PDU session for the second emergency service over the second access network; and
      perform handover of a PDU session procedure from the first access network to the second access network after establishing the second PDU session for the second emergency service.

9. The UE according to claim 8,
   wherein the second PDU session is established with a PDU Session ID, and
   wherein the PDU Session ID is used for establishing the first PDU session.

10. The UE according to claim 8,
    wherein the at least one hardware processor is configured to use a PDU Session ID of the first PDU session to be moved to the second access network in case of establishing the second PDU session.

11. The UE according to claim 8, wherein the at least one hardware processor is configured to use a PDU Session ID of the first PDU session in case of establishing the second PDU session.

12. The UE according to claim 8, wherein the first PDU session is established through a Session Management Function (SMF), and the second PDU session is established through the SMF.

* * * * *